May 22, 1934.  G. A. BARKER  1,959,702
APPARATUS FOR DETECTING FOREST FIRES
Filed April 22, 1930   2 Sheets-Sheet 1

Inventor
G. A. Barker
By
Attorney

May 22, 1934.  G. A. BARKER  1,959,702
APPARATUS FOR DETECTING FOREST FIRES
Filed April 22, 1930   2 Sheets-Sheet 2
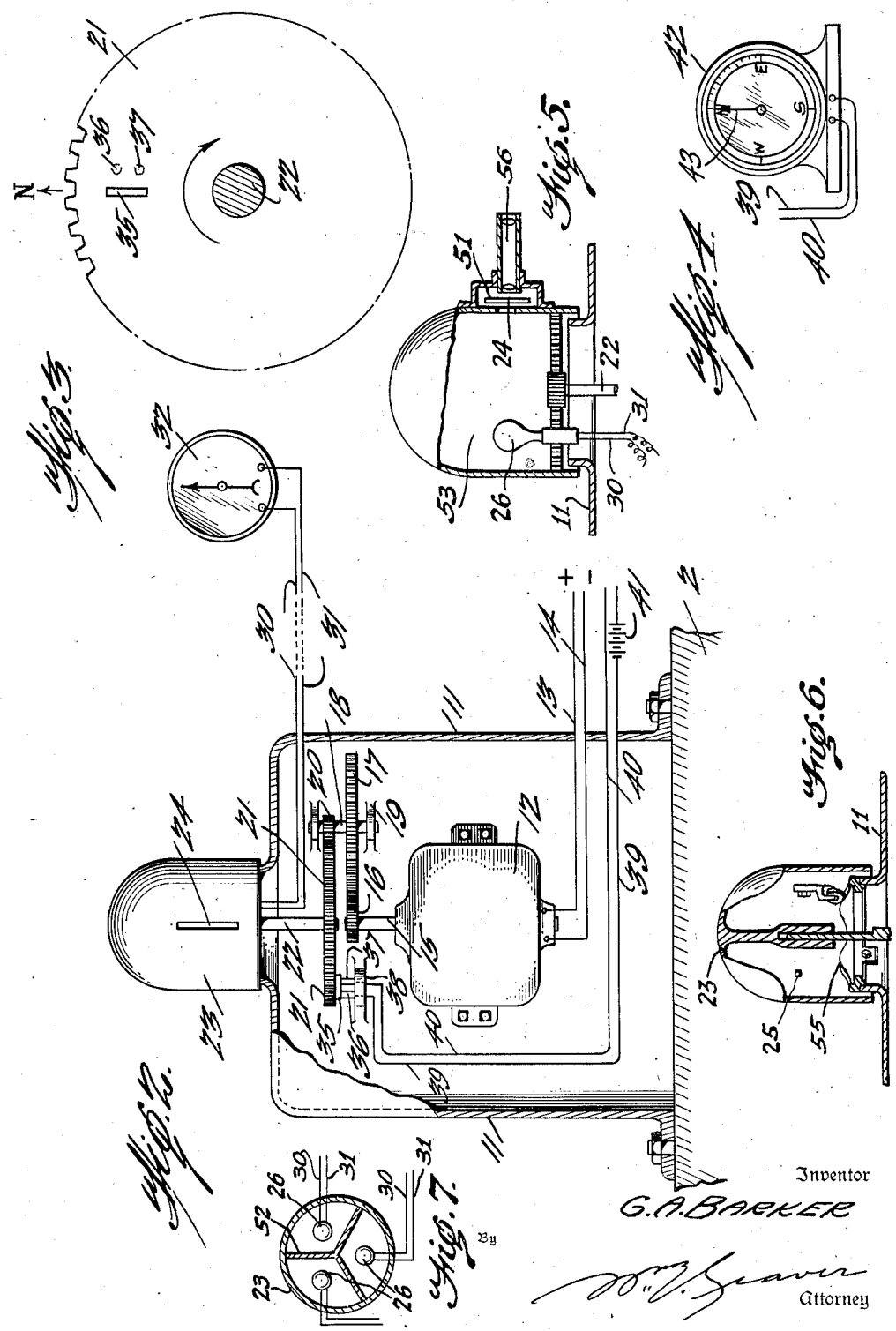
Inventor
G. A. BARKER Patented May 22, 1934

1,959,702

UNITED STATES PATENT OFFICE 1,959,702

APPARATUS FOR DETECTING FOREST FIRES

George A. Barker, Rochester, N. Y.

Application April 22, 1930, Serial No. 446,333

8 Claims. (Cl. 177—355)

The object of this invention is to provide an automatic control apparatus to detect the location of forest fires and transmit this detection to some central office, thus dispensing with the employment of especially employed men for this purpose.

Another object of this invention is to install an apparatus which would be less expensive to maintain than the employment of corps of trained men.

Another object of the invention is to provide an apparatus which would be in continuous operation twenty-four hours per day, independent of the human element, except possibly in the central office.

Another object is to provide a central recording station for determining forest fires.

Another object of this invention is to provide a system for locating the position of forest fires, utilizing a photo-electric cell or its equivalent as an observing means.

Another object of this invention is to provide an electrical method of locating the position of a forest fire.

Referring to the drawings forming a part of this specification in which like numerals designate like parts in all the views,—

Fig. 2 is a view of the photo-electric cell mounting and rotating mechanism;

Fig. 3 is a bottom plan view of the gear for causing a check of the synchronization of the central station with the photo-electric cell;

Fig. 4 is a view illustrating a device located at the central station for recording the position of one of the photo-electric cells;

Fig. 5 is a view chiefly in vertical section showing the assemblage of a sensitive element, a rotatable hood, and telescopic means associated with the hood opening for augmenting the visibility of distant objects with respect to the sensitive element;

Figure 1:
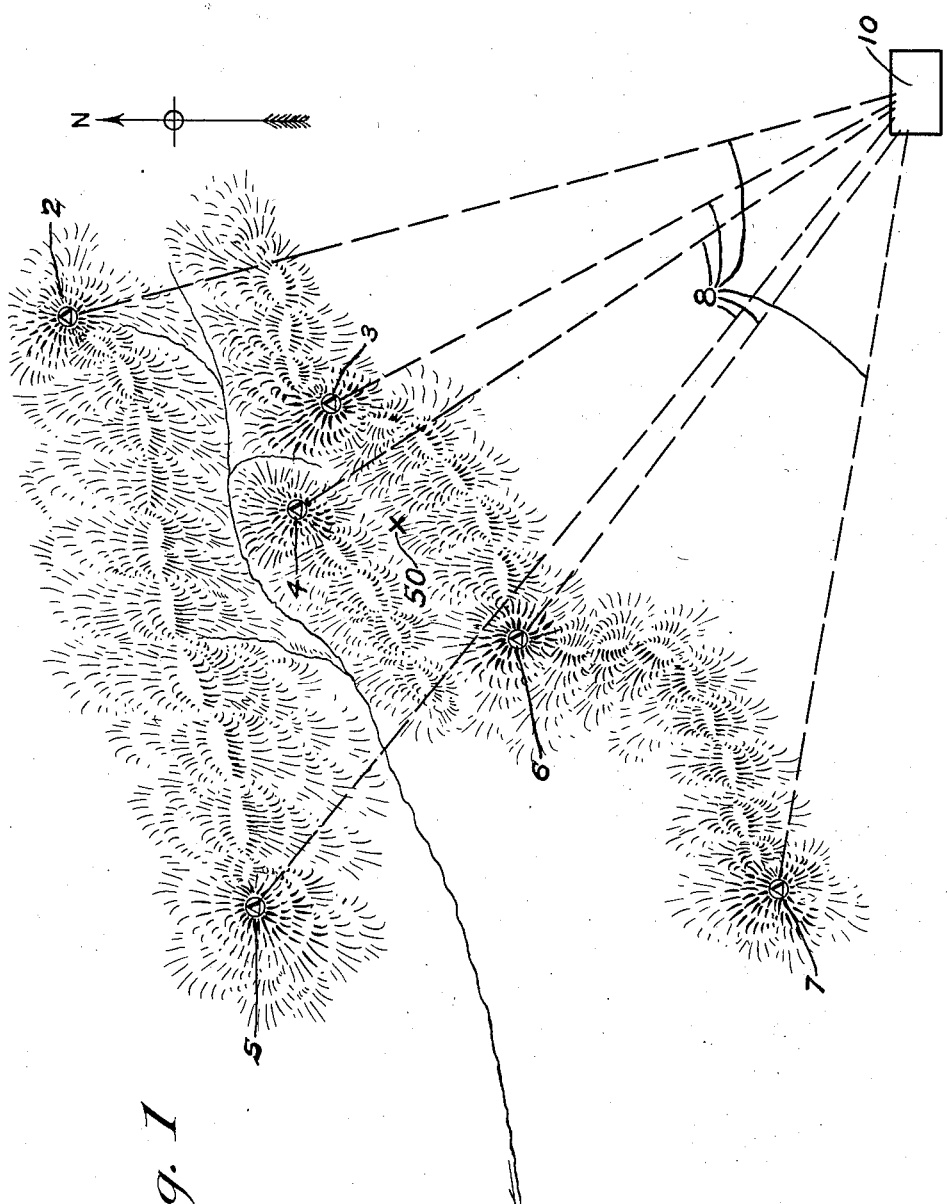
Fig. 1 is a diagrammatic plan of a forested area showing the location of fire observation stations as well as a central recording station.

Fig. 6 is a view mostly in section illustrating a cam track carried by the housing of the apparatus, and a roller carried by the rotatable hood whereby movement of said hood in vertical and horizontal planes may be affected; and Fig. 7 is a horizontal sectional view illustrating the employment of a plurality of sensitive elements separated from each other by appropriate walls and contained within a housing whereby each sensitive element may be affected by fire emanations from within a prescribed area.

For the sole purpose of detecting fires, hundreds of men are employed each year, generally stationed in observation towers located at advantageous points, such for example as mountain peaks or other high elevations affording a wide range of visibility. The towers are preferably disposed throughout the timbered area in such locations that equal ranges of visibility can be obtained from each tower. Approximately only 68% of the forest area in the United States (exclusive of Alaska) is under fire protection, and during the year 1928 the fire damage in this protected area amounted to over $8,500,000 as compared to a fire damage of over $74,000,000 in the unprotected area. Therefore, it is readily apparent that fire protection is an economic investment in spite of an expenditure of slightly over $4,000,000 during said year by Federal, State, and private agencies for forest fire protection work.

The present method of locating the position of forest fires requires that an observer be stationed at each tower. The observers, or look-out men in the towers within the visibility range of a certain forest fire, determine the angle from the azimuth of their respective towers to the forest fire and communicate this information to a central station. This information is coordinated on maps in the central office by triangulation, and the exact position of the forest fire thus determined. The efficiency of this present system is very low, and the cost of maintenance of the "look-out stations" and salaries for observers is extremely large as can be appreciated from the foregoing figures of cost.

The preferred form of apparatus according to this invention contemplates the use of a photoelectric cell although other devices such as the thermocouple, thermopile, and the bolometer may be used with substantially equal results, but obviously these said other devices could be used either independently or in conjunction with a photo-electric cell. The use of the photo-electric cell in connection with light conditions is not new, such cells having been used to determine the presence of gas in the atmosphere, to determine shades in cloth, and used in connection with talking motion pictures and television. The photo-electric cell is far more sensitive than the human eye; for example a thirty-six inch telescope having a (selenium) crystal receiver could detect the light from a candle at a distance of 350 miles.

During the day time, in the detection of forest fires, the presence of smoke in the atmsphere will affect the cell to cause a change in the current potential thereof and give a signal at some distant station. In some cases it may be to better advantage to place the cell in a valley with the light to enter the cell from the ridge of the mountains. During the rotation of the cell the light opening may be made to rise or fall to follow the contour of the ridge, or the contour of the lower limit of the forest, or any predetermined line such as the median through the forested area, such movement of the opening being accomplished as by means of an uneven track or cam as illustrated at 55 in Fig. 6. At night, the opposite effect is produced in the cell; in other words, the cell in the dark does not produce a photo-electric current, or in the case of moonlight a slight current. In case of a fire the light from the smoke or from the flames will produce a current strong enough to be transmitted to the central office.

There are several methods for measuring the photo-electric current. In cases where the light intensities are fairly high, the current may be measured directly by means of the deflection of a galvanometer. For this purpose most any well known sensitive galvanometer is applicable. When the light intensities are not so highly developed then the measurement would comprise the use of an electro-meter or a sensitive galanometer as a detector of indicator, while balancing the photo-electric current with a current which could be varied in a known manner. In other instances the method of measurement would comprise observing the rate of drift of an electro-meter needle. Other suitable steps at arriving at the correct measurment of the current might be preferred but in all cases it is to be observed that the fire is the cause of the change in the current of the cell, and any measurment of said change would be sufficient for the determination.

Referring to the drawings 2, 3, 4, 5, 6, and 7 indicate observation tower locations each connected by electrical conductors generally indicated by the dashed lines 8 to a central station 10. The preferred form of the invention contemplates the mounting of a photo-electric cell on each tower, each cell covered by a rotating hood, said hood provided with means permitting the controlled entrance of light rays to affect the cell. Thus on a tower such as 2 is rigidly mounted a casing 11 containing a fixed motor 12 receiving electric current from a suitable source over the wires 13 and 14, the shaft 15 of said motor having mounted thereon a pinion 16 meshing with a large gear 17 mounted on a stub shaft 18 supported by any suitable means such as the brackets 19 on said casing. The stub shaft 18 also carries a pinion 20 enmeshing with a large gear 21 mounted on the lower end of a vertical shaft 22 whose upper end extends out of the casing 11 and carries rigidly therewith a base upon which latter is secured the hood or mesh 23 provided in a side wall thereof with a restricted opening such as a narrow vertical slot 24 illustrated in Fig. 2 or a smaller opening such as indicated at 25 in Fig. 6.

A photo-electric cell, diagrammatically represented at 26 in Fig. 5 is mounted within the hood for rotation therewith or may be made stationary with respect thereto, the sensitive element of said cell being disposed opposite the slot 24 whereby no mechanical interruption of the light rays, in reaching said cell, will exist. Electric conductors, such as the wires 30 and 31 leading from a sensitive galvanometer 32 located in the central station, are connected to the photo-electric cell either through a plug and jack arrangement, spring tensioned brushes making contact with circular conducting strips, or other device whereby the current controlled by the cell may be transmitted to the stationary conducting wires such as 30 and 31. Thus it will be seen that light or heat conditions may affect the cell through the restricted openings such as 24 or 25 in accordance with the position of said opening during its movement with its hood, and that the cell may by its inherent characteristics be affected by the radian energy of said light and/or heat conditions to create differences in its current potential or its photo-electric current which differences are readily registered by the galvanometer 32 at the central station. It may be found desirable to station a man at some point where he could observe the weather conditions adjacent a group of several towers, said man being in communication with the central station common to all the towers of said group whereby he could advise the central station of the varying general weather conditions such as bright sunshine, bright without sunshine, dull, and darkened by clouds, etc. The advantage of this auxiliary human observation would be to serve as a check upon the variance of galvanometer readings for otherwise such variations might be interpreted as signals of the presence of a fire.

The gear 21 of the motor speed reduction train has mounted on one face thereof, at a point relatively near its periphery, a metallic lug 35 of any suitable shape which, in its revoluble travel, will bridge the gap across two projecting pins 36 and 37 which pins are suitably mounted in spaced relation in an insulated bracket number 38 secured to the casing 11. The pins 36 and 37 are terminals respectively of electrical conductors 39 and 40 of a circuit including a source of energy such as the battery 41, said circuit including an indicator such as a clock 42 whose face is divided into subdivisions of the points of the compass, and which is provided with a hand 43 adapted to make one complete revolution of the face in the time of one revolution of the photo-electric cell and/or its hood. Any well known clock mechanism, driven by any suitable motive power, may be provided whose revolutionary movements may be synchronized with the motor 12 driving the cell, and in this connection it might be stated that the cells will be found efficient for their purpose if given a time element of five minutes for each revolution. This synchronization may be mechanically accomplished substantially accurately by the employment of gears such as 16, 17, 20 and 21 but the clock 42 may be, and generally is, provided with a suitable trip device whereby any setting of the hand 43 may be made.

In order that the clocks at the central station may be properly set with their respective photo-electric cells, the lug 35 on the gear 21 is provided. That is to say when said lug bridges the terminal pins 37 and 36 an electric circuit is closed which will automatically operate the aforementioned trip to set the hand of the connected clock to a predetermined compass reading, said reading (such as North) being in accord with the compass position of the vertical plane of the cell and associated hood slot at the time of the closing of said circuit.

In connection with the cells it might be stated that a telescope indicated at 56 obviously could be attached to the hood to obtain greater distance, and light filters indicated at 51 could be used to eliminate detrimental or undesired rays. Further, it is possible to employ two or more stationary or revoluble cells as a group at each tower arranged with interposed shields as suggested at 52 in Fig. 7 so that each cell would have a limited range of susceptibility, the angular range being dependent upon the number of cells so grouped and each cell independently connected to the central station. It is still further contemplated to employ a stationary cell within the rotating hood 23 but in such case the inner surface of said hood or a portion thereof should provide a reflecting surface indicated diagrammatically at 53 in Fig. 5 to train the light rays, entering through the slot 24, onto the sensitive element of said cell. In this last mentioned arrangement it is particularly to be pointed out that the slot 24 or other restricted opening is the governing factor of fire direction and the automatic indication thereof at the central station.

From the foregoing it will thus be seen that should a fire start at a point such as 50 it could be detected by the cells located at towers 3, 4 and 6 when the hood associated with each of said cells had revolved sufficiently to bring its slot or opening in line with its cell and the smoke or flame of said fire, this being referred to in the appended claims as "the line of sight" which, by virtue of the movement of the mask or hood, obviously is caused to sweep the forest area being supervised. The galvanometer at the central station associated with each cell would indicate the change in the potential current of said cell through its affectation by the radiant energy emanation from the fire, and when this indication took place the attendant at the central station would observe the compass reading on the clock associated with each cell. A plotting of these readings on a scale map of the protected or supervised forested area would then establish the definite location of the fire, whereupon crews could be accurately dispatched by the shortest routes to fight the fire. The clock readings would be in accord with the azimuth departure position of the slot of each hood as hereinbefore brought out.

It is obvious that those skilled in the art may vary the steps and combinations of steps constituting this method as well as vary the details of construction and arrangement of parts constituting the apparatus without departing from the scope of the invention, and therefore it is not desired to be limited to the foregoing disclosure except as may be demanded by the claims.

What is claimed is:—

1. In a system for detecting forest fires the combination of a plurality of separated detecting stations located at predetermined points in an area to be supervised, and a central station, each detecting station provided with an element sensitive to an emanation from a forest fire operating through radiant energy, indicating means located at the central station for showing which of the sensitive elements has been affected by such emanation, each detecting station further provided with a mask surrounding the element and having an opening defining a line of sight for said element, said opening adapted to pass the energy of such emanation to said element; means to move said mask to cause said line of sight to sweep said area; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

2. In a system for detecting forest fires the combination of a plurality of separated detecting stations located at predetermined points in an area to be supervised, and a central station, each detecting station provided with an element sensitive to an emanation from a forest fire operating through radiant energy, indicating means located at the central station for showing which of the sensitive elements has been affected by such emanation, each detecting station further provided with a mask surrounding the element and having an opening defining a line of sight for said element, said mask provided with means to augment the visibility of such emanation by said element, said opening adapted to pass the energy of such emanation to said element; means to move said mask to cause said line of sight to sweep said area; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

3. In a system for detecting forest fires the combination of a plurality of separated detecting stations located at predetermined points in an area to be supervised, and a central station, each detecting station provided with an element sensitive to an emanation from a forest fire operating through radiant energy, indicating means located at the central station for showing which of the sensitive elements has been affected by such emanation, each detecting station further provided with a mask surrounding the element and having an opening defining a line of sight for said element, said mask provided with a telescope associated with said opening to augment the visibility of such emanation by said element, said opening adapted to pass the energy of such emanation to said element; means to move said mask to cause said line of sight to sweep said area; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

4. In a system for detecting forest fires the combination of a plurality of separated detecting stations located at predetermined points in an area to be supervised, and a central station, each detecting station provided with an element sensitive to an emanation from a forest fire operating through radiant energy, indicating means located at the central station for showing which of the sensitive elements has been affected by such emanation, each detecting station further provided with a mask surrounding the element and having an opening defining a line of sight for said element, said mask provided with a telescope and a light filter associated with said opening to augment the visibility of such emanation by said element, said opening adapted to pass the energy of such emanation to said element; means to move said mask to cause said line of sight to sweep said area; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

5. In a system for detecting forest fires the combination of a plurality of separated detecting stations located at predetermined points in an area to be supervised and having forest growth at varying elevations visible from said detecting stations, and a central station, each detecting station provided with an element sensitive to an emanation from a forest fire operating through radiant energy, indicating means located at the central station for showing which of the sensitive elements has been affected by such emanation, each detecting station further provided with a mask surrounding the element and having an opening defining a line of sight for said element, said opening adapted to pass the energy of such emanation to said element; means to move said mask to cause said line of sight to follow a predetermined line of varying elevation in said growth; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

6. In a system for detecting forest fires the combination of a plurality of separated detecting stations located at predetermined points in an area to be supervised and having forest growth at varying elevations visible from said detecting stations, and a central station, each detecting station provided with an element sensitive to an emanation from a forest fire operating through radiant energy, indicating means located at the central station for showing which of the sensitive elements has been affected by such emanation, each detecting station further provided with a mask surrounding the element and having an opening defining a line of sight for said element, said opening adapted to pass the energy of such emanation to said element; means to move said mask to cause said line of sight to follow a predetermined line of varying elevation in said growth, said means including a cam track having a surface formed in accordance with said line; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

7. In a system for detecting forest fires the combination of a plurality of separated detecting stations located at predetermined points in an area to be supervised, and a central station, each detecting station provided with an element sensitive to an emanation from a forest fire operating through radiant energy, indicating means located at the central station for showing which of the sensitive elements has been affected by such emanation, each detecting station further provided with a mask for the element and having an opening defining a line of sight for said element, said opening adapted to pass the energy of such emanation to said element; means to cause relative movement between said element and said mask to cause said line of sight to sweep said area; a position indicator at the central station for each detecting station, said position indicator provided with means for showing the compass position of the line of sight of the mask of its associated detecting station; and synchronizing means between each mask and its associated position indicator for causing the latter to show the compass position of the line of sight of said mask.

8. In a system for detecting forest fires, a plurality of spaced and predeterminedly located detecting stations in an area to be supervised, a central station, an element at each detecting station operating through radiant energy and sensitive to an emanation from a forest fire, indicating means at the central station for indentifying the element at a detecting station affected by such emanation, a mask for each element having an opening defining a line of sight therefor, means to effect relative movement between said element and mask such that said line of sight sweeps the area, a movable position indicating mechanism at said central station associated with each detecting station for indicating the compass position of the line of sight of the mask at the latter station, and means to synchronize the movement of said position indicating mechanism with the movement at the associated detecting station.

GEORGE ARTHUR BARKER.